United States Patent [19]

Schmid et al.

[11] Patent Number: 5,497,158
[45] Date of Patent: Mar. 5, 1996

[54] METHOD OF CLASSIFYING AND IDENTIFYING AN OBJECT USING DOPPLER RADAR

[75] Inventors: Johannes Schmid, Behringweg; Peter Schmitt, Bellenberg, both of Germany

[73] Assignee: Daimler-Benz Aerospace AG, Ulm, Germany

[21] Appl. No.: 274,317

[22] Filed: Jul. 13, 1994

[30] Foreign Application Priority Data

Jul. 15, 1993 [DE] Germany ............................ 43 23 625.1
Mar. 3, 1994 [DE] Germany ............................ 44 06 907.3

[51] Int. Cl.⁶ ..................... G01S 7/292; G01S 13/53; G01S 13/90; G01S 7/41
[52] U.S. Cl. ..................................... 342/90; 342/25
[58] Field of Search ............................ 342/90, 25, 197, 342/190, 191

[56] References Cited

U.S. PATENT DOCUMENTS

| | | | |
|---|---|---|---|
| H1181 | 5/1993 | Rihaczek ..................... | 342/25 |
| 4,191,957 | 3/1980 | Walker et al. ................ | 342/190 |
| 4,450,444 | 5/1984 | Wehner et al. ............... | 342/25 |
| 4,540,985 | 9/1985 | Clancy et al. ................ | 342/90 |
| 4,546,354 | 10/1985 | Boles ......................... | 342/179 |
| 4,546,355 | 10/1985 | Boles ......................... | 342/179 |
| 4,855,747 | 8/1989 | Steinberg .................... | 342/179 |
| 5,068,664 | 11/1991 | Appriou et al. .............. | 342/90 |
| 5,164,730 | 11/1992 | Jain ............................ | 342/25 |
| 5,184,133 | 2/1993 | Tsao .......................... | 342/25 |
| 5,243,351 | 9/1993 | Rafanelli et al. ............ | 342/351 |
| 5,309,159 | 5/1994 | Shahaf et al. ............... | 342/90 |
| 5,343,204 | 8/1994 | Farmer et al. ............... | 342/25 |
| 5,381,154 | 1/1995 | Guerci ....................... | 342/90 |
| 5,392,050 | 2/1995 | Guerci et al. ............... | 342/90 |
| 5,402,131 | 3/1995 | Pierce ........................ | 342/194 |

FOREIGN PATENT DOCUMENTS 2189962 11/1987 United Kingdom.

Primary Examiner—John B. Sotomayor
Attorney, Agent, or Firm—Spencer & Frank

[57] ABSTRACT

The invention relates to a method of classifying and identifying an object, for example satellites, aircraft, land vehicles and ships with a Doppler radar system in which a video signal is generated by means of coherent signal processing and tracking data including, position and changes in position, are determined from the video signal for the object. The method includes representing the object as an inverse synthetic radar aperture image and then selecting a reference object with the aid of the tracking data and the rotational axis of the object. A representation of the reference object is rotated into a position that corresponds to the spatial rotational axis of the object and then superimposed over the inverse synthetic aperture radar image of the object. Identification of the object is effected by comparing the representation of the rotated reference object with the inverse synthetic aperture radar image.

10 Claims, 4 Drawing Sheets

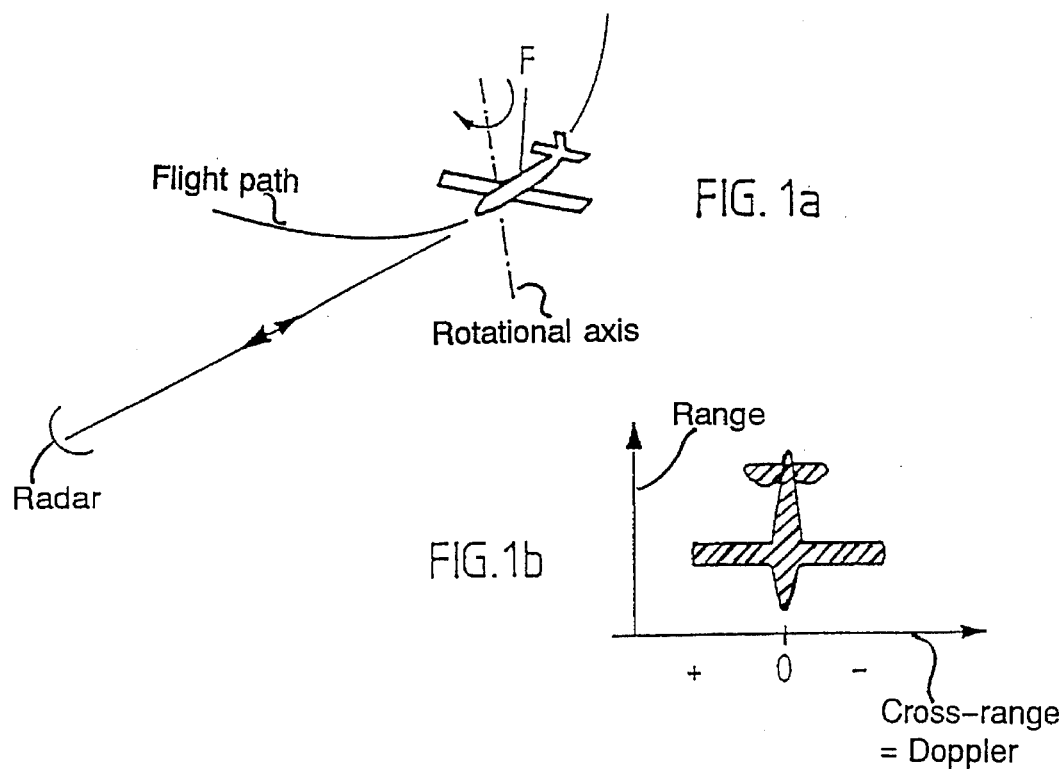
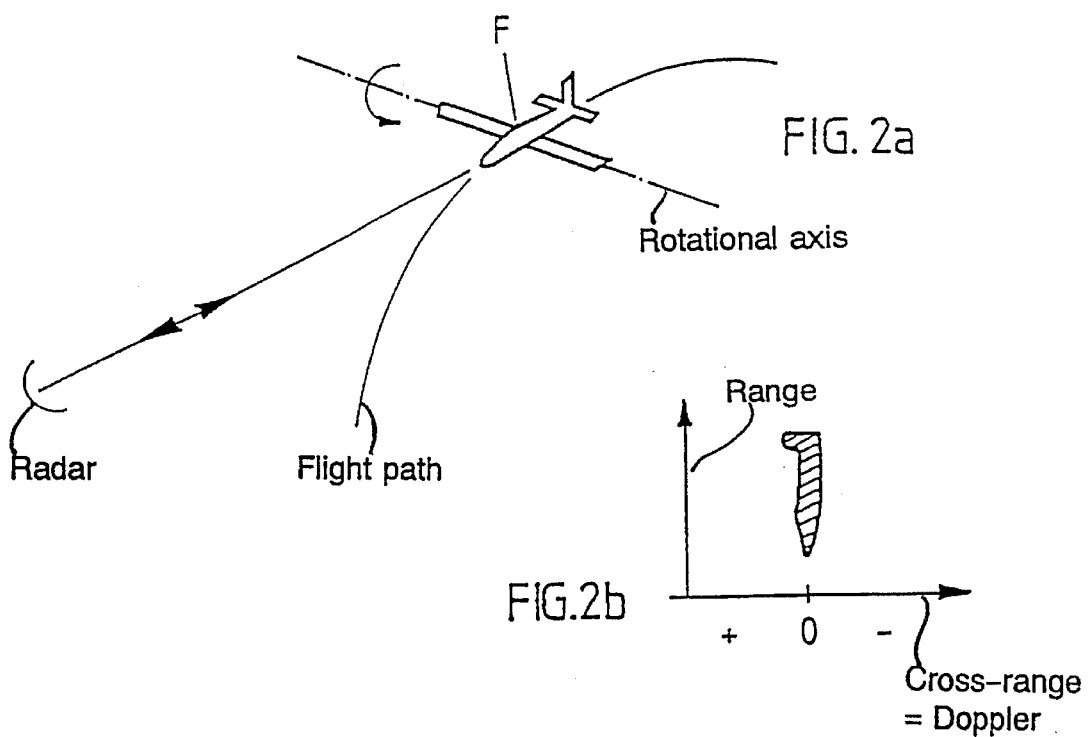

METHOD OF CLASSIFYING AND IDENTIFYING AN OBJECT USING DOPPLER RADAR

CROSS REFERENCE TO RELATED APPLICATIONS

The present invention claims the right of foreign priority of application No. P43 23 625.1 filed in Germany on Jul. 15, 1993 and application No. P44 06 907.3 filed in Germany on Mar. 3, 1994, the disclosures of which are incorporated herein by reference.

BACKGROUND OF THE INVENTION

The invention relates to a method of classifying and identifying an object with the aid of a Doppler radar system, wherein a video signal is first generated by means of coherent signal processing, at least the tracking data of position and changes in position are determined from the video signal for the object, and classification is effected with the aid of the tracking data. The invention also relates to the use of such a method.

With the aid of a Doppler radar system, it is possible, based on the radar echo signal and the tracking data determined therefrom, particularly position and changes in position, to classify and/or identify an object that reflects radar waves.

An object can be classified on the basis of its size and its spatial position, and/or changes in position. In this classification, the distinction can be made between, for example, aircraft (which for purposes herein includes satellites), land vehicles and stationary targets. The foregoing classifications can be further subdivided into subcategories referred to herein as identification.

The resolution capacity and reliability of known classification and identification methods are essentially a function of the aperture of the radar antenna and the type of radar system, such as pulse-modulated Doppler radar or continuous-wave (c.w.) radar.

SUMMARY OF THE INVENTION

It is an object of the present invention to provide a generic method that permits high spatial resolution as well as reliable and cost-effective evaluation of radar images that can be represented on a viewing screen during a classification and identification process.

It is a further object of the invention to provide advantageous uses of such a method.

The above and other objects are accomplished in accordance with the invention wherein there is provided a method of classifying and identifying an object with the aid of a Doppler radar system, as first described above, wherein the method additionally includes representing the object as an Inverse Synthetic Aperture Radar (ISAR) image, selecting a reference object with the aid of the tracking data and the rotational axis of the object, rotating a representation of the reference object into a position that corresponds to the spatial rotational axis of the object, superimposing the representation of the rotated reference object over the ISAR image of the object, and comparing the representation of the rotated reference object with the ISAR image to identify the object.

One advantage of the invention is that the method is universally applicable, and can therefore be adapted to different radar systems and/or monitoring functions.

A second advantage is that use is made of two-dimensional radar images that can be generated cost-effectively, making it possible for an observer to perform a reliable evaluation on a viewing screen.

Other advantages, benefits and feature of the invention will become apparent from the following description.

The invention is based on the use of the ISAR method, with which the aperture of the radar antenna can be significantly increased. In the classic Synthetic Aperture Radar (SAR) method, a pulse radar system is preferably used that has a transmitting/receiving antenna whose aperture is small, because the entire pulsed radar system is configured as, for example, onboard radar of an airplane. Use is made of the fact that the path, e.g. the precise flight path, of the (onboard) radar system is known, for example with a maximum allowable deviation of $\lambda/4$, where $\lambda$ represents the wavelength of the radar waves used. If the (onboard) radar system is now moved by the segment L, and the radar echo signals are evaluated both at the beginning and end of segment L, the result is a target resolution (angular resolution) for the (onboard) radar system that is proportional to $\lambda/L$. This target resolution of the moved (onboard) radar system is significantly higher than that of the (onboard) radar antenna in and of itself. When an (onboard) radar system is moved in this way, not only is radial target resolution possible in the meter range, for example less than 5 m, in the range direction, also referred to as "range"or "slant range" in English-language literature, but also in a direction perpendicular to the range, referred to as "cross range."

In the inverse SAR method, that is, the ISAR method, the Doppler signal based on a rotational movement of the target around one of its rotational axes, e.g. the roll, pitch or yaw axis, is additionally evaluated. From this rotational movement, the target dimensions are determined in the cross range. Minimal rotational movements of a few degrees/ second are required, and target resolutions of less than 1 m can be achieved in cross-range target resolutions.

Unlike the SAR method, movement of the radar system with the ISAR method is not absolutely necessary because the information is derived from rotational movements of the target in the ISAR method. The ISAR method is described in detail in the book: D. R. Wehner: "High Resolution Radar", Artech House, Norwood (1987). In principle, ISAR processing can be implemented with any pulse Doppler radar.

In the ISAR method, two-dimensional radar images, referred to herein as ISAR images, of a (radar) target are preferably displayed on a viewing screen. The cross range and slant range (or simply range) are shown in a right-angled coordinate system, the selection of the axes being arbitrary.

These kinds of ISAR images are difficult to evaluate, because generally neither the type of detected object (radar target) nor its spatial position is known.

This apparent drawback is eliminated in that the tracking data of a radar target, for example an airplane, are first determined. In the example of an airplane, at least the velocity and flight path are determined from the tracking data. The tracking data can advantageously be determined in an arbitrary manner, for example by means of the (onboard) radar system, which generates the ISAR images, and/or a ground radar system or naval radar system, and/or satellite navigation. The tracking data are initially used to perform a rough classification and identification of the radar target. For example, for aircraft the distinction can be made between a zeppelin, helicopter, sporting plane or commercial plane, and a military plane on the basis of the flight speed and/or the flight path. With this knowledge and a further evaluation of the tracking data, the spatial position and attitude of the object (radar target) is determined with respect to an arbitrary inertial system. For example, based on the flight physics, the spatial position and attitude of the object (airplane), such as a military pursuit plane, can be determined from the speed and radius of curvature of the momentary flight path being followed. During curved flight, it can be determined that the momentary plane of the airplane, i.e. the plane defined by the wings (pitch axis) and the longitudinal axis (roll axis), (with respect to the plane defined by the flight path) must be rotated around the roll axis by a certain angle, since (flight) physics dictates that curved flight is not possible otherwise. The tracking data also show, how the aircraft position and attitude change with time. This change in position and attitude is equivalent—from the ISAR image point of view—to a rotation of the aircraft around an axis. The direction of this axis (and the angular velocity) can be determined by elementary geometrical considerations.

With the aid of these data, a reference object is now selected that approximately corresponds to the actual radar target, for example a reference pursuit plane that possesses approximately the same geometrical dimensions and three-dimensional shape as the radar target. This selection is preferably made with the aid of a data-processing system in which different reference objects are stored.

This reference object and the tracking data of the radar target are now transmitted to the (onboard) radar system, in which the two-dimensional ISAR images are generated. Because the distance and direction of the radar target are now known, the anticipated visual, two-dimensional representation of the reference object can be determined. This visual representation, preferably a corresponding profile, of the reference object (airplane) rotated to correspond to the (flight) position is now superposed over the ISAR image of the radar target. Because the ISAR images and/or radar scattering centers associated with the reference object are now known, it can be determined in a cost-effective and reliable manner whether the ISAR image of the radar target can be assigned to the reference object. Precise and reliable classification and identification of radar targets is possible for different applications with this comparison, which is described in greater detail below by way of an example related to the classification and identification of an airplane, with reference to schematically represented drawing figures.

BRIEF DESCRIPTION OF THE DRAWINGS

FIGS. 1a and 1b illustrate the connection between the range axis and cross-range axis for ISAR images as a function of the rotational axis of an airplane executing a horizontal curved flight.

FIGS. 2a and 2b illustrate the connection between the range axis and cross-range axis for ISAR images as a function of the rotational axis of an airplane initiating a descent.

DETAILED DESCRIPTION OF THE PREFERRED EMBODIMENT

FIG. 1a shows an airplane F (target) that executes a horizontal curved flight path. The corresponding tracking data are determined from the associated flight path in a known way. The rotational axis of airplane F can also be determined from this tracking data. The pulse-modulated Doppler (onboard) radar system, called radar, of the same or of a further airplane generates, in accordance with the known ISAR method, an ISAR image of the target from the illustrated perspective, that is, approximately with a momentary (radar) viewing direction in the direction of the longitudinal axis of airplane F. Over the further course of the horizontal curved flight path, the cross-range axis (Doppler axis) adjusts to become perpendicular to the longitudinal flight axis, and an ISAR image is produced that corresponds to a top view of airplane F as shown in FIG. 1b.

FIG. 2a shows the same initial situation as in FIG. 1a, but with airplane F (target) initiating a descent, i.e. airplane F rotates around its pitch axis. Therefore, in the further course of the flight path, a side view of airplane F is to be expected in the ISAR image of the (onboard) radar system. (Note that the cross range or Doppler axis is always orthogonal to both the slant range axis the rotational axis.)

From the reference airplane determined from the tracking data of the flight paths, representations corresponding to the flight paths or rotational axes, respectively, are selected and superposed over the ISAR images. For example, a top view is superposed over the ISAR image in FIG. 1b, and a side view over the ISAR image in FIG. 2b. In the following description the numbers of the processing steps are as indicated in FIG. 7.

Figure 3:
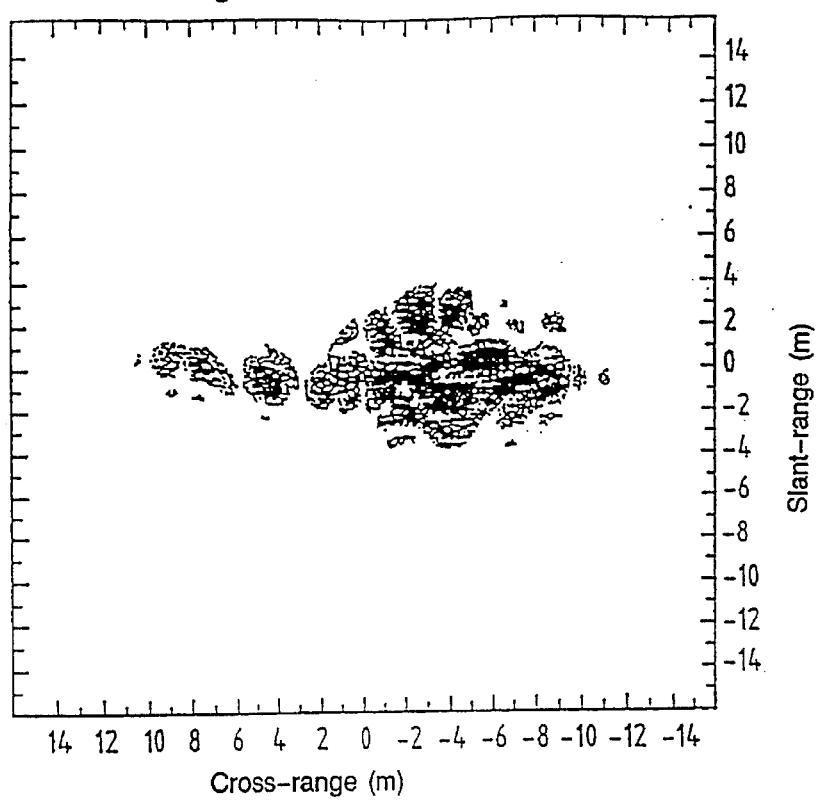
FIGS. 3 and 4 illustrate ISAR images associated with an aircraft.
Figure 4:
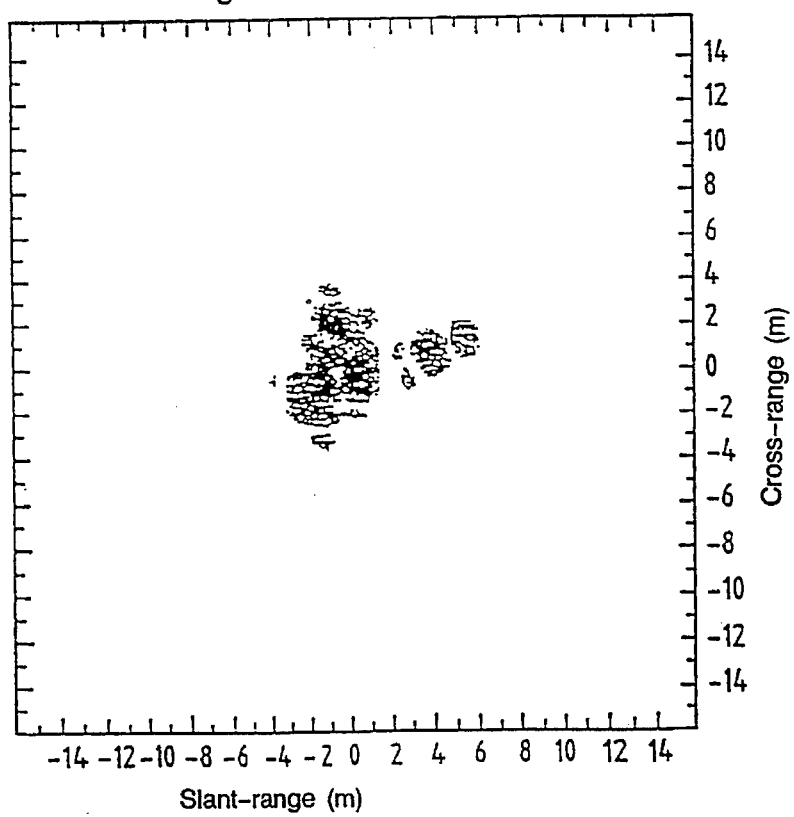
Figure 7:
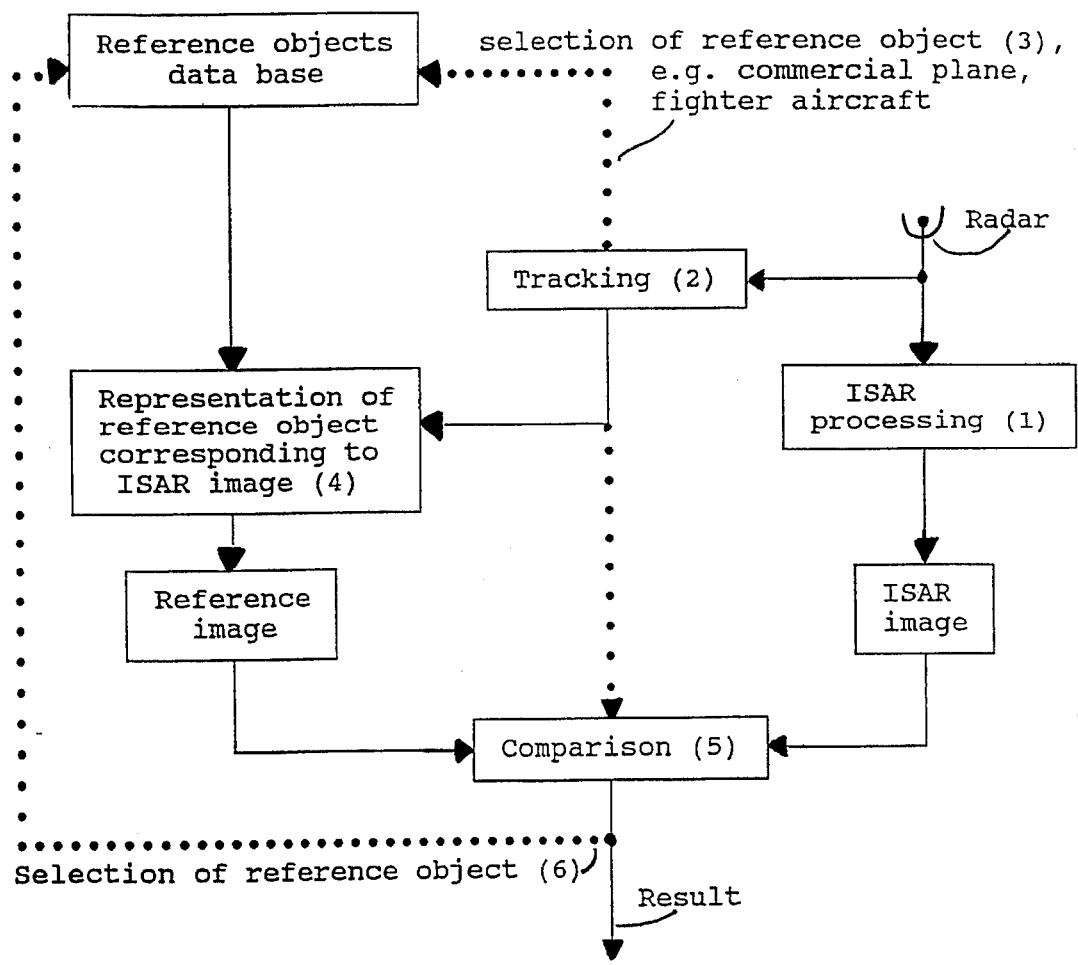
FIG. 7 shows a flow diagram of the functional steps of the method.

FIGS. 3 and 4 illustrate momentary ISAR images of an airplane during different flight maneuvers generated by processing step (1) of FIG. 7. It can be seen from these ISAR images that it would take a great deal of experience and a very costly evaluation method to classify and identify the type of airplane and its spatial representation.

Figure 5:
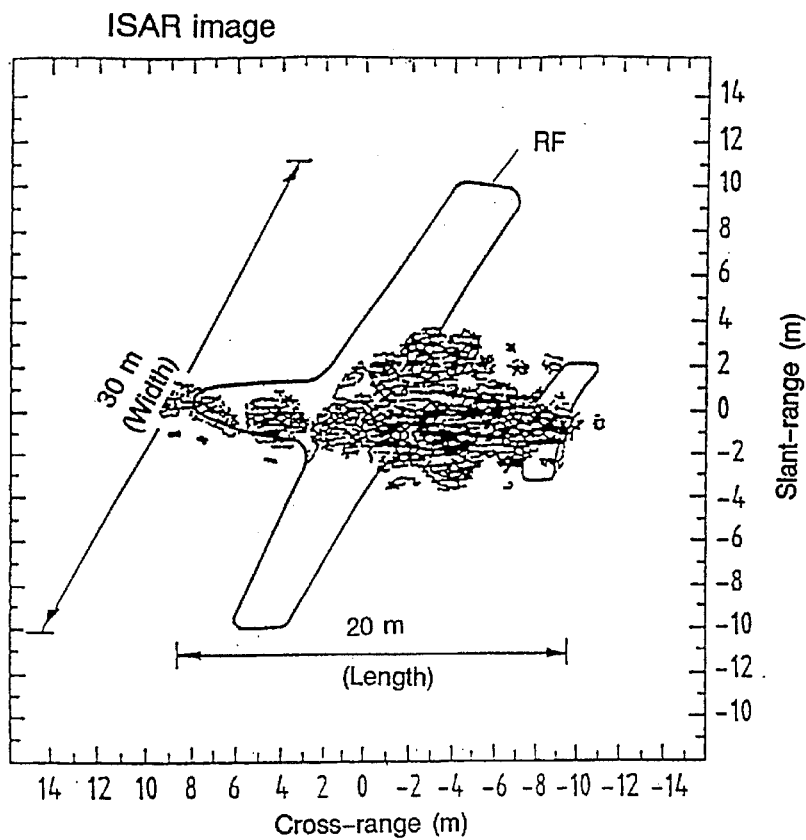
FIGS. 5 and 6 illustrate the ISAR images that correspond to those in FIGS. 3 and 4, over which profiles of a corresponding reference object (airplane) are superposed.

From the tracking data associated with FIGS. 3 and 4, it can be determined that the radar target is a military jet plane, e.g. a pursuit plane. The tracking date also yield the targets position, attitude and rotational axis (step 2)). Correspondingly, an airplane having a length of approximately 20 m and a wingspan of approximately 30 m is selected as the reference airplane RF (step (3)). The spatial representation of reference airplane RF is selected to correspond to that of the associated ISAR image (step (4)), and the corresponding profile of the reference airplane is superposed over the ISAR image as shown in FIGS. 5 and 6 (step (5)).

Figure 6:
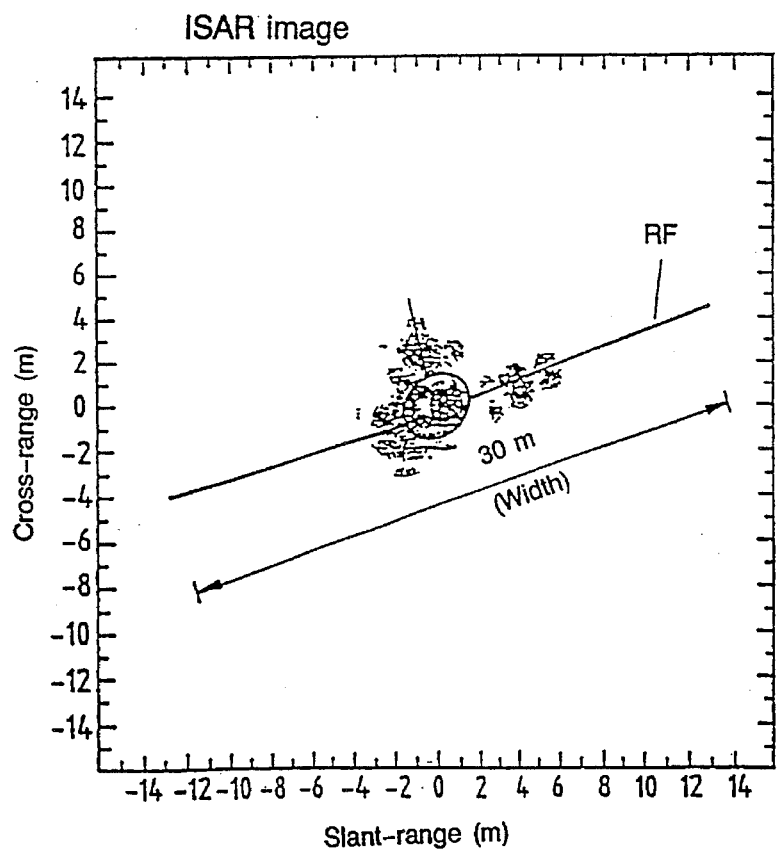

The radar scatter centers represented in the ISAR images make it readily apparent that the radar target (ISAR images) and the reference airplane RF coincide to a great extent with respect to length (FIG. 5) and the tail unit (FIG. 6). The wings, however, are not in agreement in shape and width. However, it can be seen from FIGS. 5 and 6 that the radar target is an airplane that has sharply backswept wings. Such an evaluation thus produces an airplane approximately 20 m in length, with sharply backswept wings, a small wing span and a relatively high tail unit. This information, along with the associated tracking data of the airplane, permits precise classification and identification of the radar target. (Alternatively, the feed back path (6) in FIG. 7 can be used to select a better reference object and thereby improve the classification/ identification.)

The described method is not limited to the described examples. For example, the type of Doppler radar system (e.g. pulsed radar or c.w. system) can be selected to correspond to the type and/or range of the radar targets to be classified and identified, for example satellites, aircraft, land vehicles and ships. Furthermore, the selection of the reference object and its spatial representation, and the comparison with the ISAR image may be accomplished with the aid of an image recognition and comparison method in a data-processing system.

The method according to the invention has a variety of uses. For example, the method according to the invention may be advantageously employed to monitor aviation or naval paths. When two airplanes or ships are on a possible collision course, the airplane or ship, respectively, that has better maneuverability can be determined, and the pilot or navigator involved can correspondingly be informed, so that suitable evasive maneuvers may be timely initiated.

Classification and identification of so-called uncooperative participants in air traffic is additionally possible with the method according to the invention. Uncooperative participants comprise airplanes that have no automatically operating recognition apparatus, e.g. a transponder.

The invention has been described in detail with respect to preferred embodiments, and it will now be apparent from the foregoing to those skilled in the art that changes and modifications may be made without departing from the invention and its boarder aspects, and the invention, therefore, in the appended claims to cover all such changes and modifications as fall within the true spirit of the invention.

What is claimed is:

1. A method of classifying and identifying an object with a Doppler radar system in which a video signal is generated by means of coherent signal processing, comprising:

determining at least position, change of position and spatial orientation of a rotational axis of the object from tracking data of the object;

representing the object as an inverse aperture synthetic radar image;

selecting a reference object with the aid of the tracking data and the determinations of said determining step;

rotating a representation of the reference object into a position that corresponds to the spatial orientation of the rotational axis of the object;

superimposing the representation of the rotated reference object over the inverse synthetic aperture radar image of the object; and comparing the representation of the rotated reference object with the inverse synthetic aperture radar image to identify the object.

2. A method as defined in claim 1, wherein said representing step includes generating the inverse synthetic aperture radar image as a two-dimensional radar image.

3. A method as defined in claim 1, wherein said representing step includes producing the inverse synthetic aperture radar image with a pulse-modulated Doppler radar system.

4. A method as defined in claim 1, wherein said representing step includes producing the inverse synthetic aperture radar image with a mobile radar system.

5. A method as defined in claim 1, wherein said representing step includes producing the inverse synthetic aperture radar image with an onboard radar system of an aircraft.

6. A method as defined in claim 1, wherein the object is an aircraft.

7. A method as defined in claim 1, wherein the object is a ship.

8. A method as defined in claim 1, wherein the object is a land vehicle.

9. A method as defined in claim 1, wherein the object is an uncooperative participant in traffic.

10. A method of classifying and identifying a target aircraft with a Doppler radar system in which a video signal is generated by means of coherent signal processing, comprising:

determining a flight path, speed and spatial orientation of a rotational axis of the target aircraft from tracking data of the target aircraft;

representing the target aircraft as an inverse synthetic radar aperture image;

selecting a reference aircraft with the aid of the tracking data and the determinations of said determining step;

rotating a representation of the reference aircraft into a position that corresponds to the spatial orientation of the rotational axis of the target aircraft;

superimposing the representation of the rotated reference aircraft over the inverse synthetic aperture radar image of the target aircraft; and comparing the representation of the rotated reference aircraft with the inverse synthetic aperture radar image to identify the target aircraft.

* * * * *